US011762080B2

(12) United States Patent
Vo et al.

(10) Patent No.: US 11,762,080 B2
(45) Date of Patent: Sep. 19, 2023

(54) COMMUNICATIONS SIGNALS AS RADAR USING SYNCHORONIZED TIME DELAYS OF MULTIPATH REFLECTIONS

(71) Applicant: Meta Platforms Technologies, LLC, Menlo Park, CA (US)

(72) Inventors: Minh Phuoc Vo, Larkspur, CA (US); Kiran Kumar Somasundaram, Bellevue, WA (US); Steven John Lovegrove, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 345 days.

(21) Appl. No.: 17/109,724

(22) Filed: Dec. 2, 2020

(65) Prior Publication Data

US 2022/0082679 A1    Mar. 17, 2022

Related U.S. Application Data

(60) Provisional application No. 63/078,743, filed on Sep. 15, 2020.

(51) Int. Cl.
*G01S 13/52* (2006.01)
*G01S 13/04* (2006.01)
(Continued)

(52) U.S. Cl.
CPC ............. *G01S 13/52* (2013.01); *G01S 7/415* (2013.01); *G01S 13/003* (2013.01); *G01S 13/04* (2013.01);
(Continued)

(58) Field of Classification Search
CPC ........ G01S 13/52; G01S 3/8022; G01S 7/415; G01S 13/003; G01S 13/04; G01S 2013/462; H04W 56/0055; H04W 84/12
See application file for complete search history.

(56) References Cited

U.S. PATENT DOCUMENTS 9,455,824 B1 *  9/2016  Tujkovic ............... G01S 19/235
2010/0207804 A1 *  8/2010  Hayward ............. G01S 13/003
                                                              342/28

(Continued)

OTHER PUBLICATIONS

Pu, et al., Whole-Home Gesture Recognition Using Wireless Signals, MobiCom'13, pp. 1-12, 2013.
(Continued)

*Primary Examiner* — Donald HB Braswell
(74) *Attorney, Agent, or Firm* — Baker Botts L.L.P.

(57) ABSTRACT

A method includes receiving a first wireless signal detected by a first device in an environment, the first wireless signal including a first distortion pattern caused by an object moving in the environment, receiving a second wireless signal detected by a second device in the environment, the second wireless signal including a second distortion pattern caused by the object moving in the environment, determining, by comparing the first distortion pattern to the second distortion pattern, that the first distortion pattern and the second distortion pattern correspond to a same movement event associated with the object moving in the environment, determining a timing offset between the first device and the second device based on information associated with the first distortion pattern and the second distortion pattern, and determining, based on the timing offset, temporal correspondences between data generated by the first device and data generated by the second device.

14 Claims, 5 Drawing Sheets

(51) Int. Cl.
  *G01S 13/00*   (2006.01)
  *G01S 13/46*   (2006.01)
  *G01S 7/41*    (2006.01)
  *H04W 56/00*   (2009.01)
  *H04W 84/12*   (2009.01)

(52) U.S. Cl.
  CPC ....... *H04W 56/0055* (2013.01); *H04W 84/12* (2013.01); *G01S 2013/462* (2013.01)

(56) References Cited

U.S. PATENT DOCUMENTS

| | | | | |
|---|---|---|---|---|
| 2016/0187475 | A1* | 6/2016 | Horng | G01S 13/88 |
| | | | | 342/21 |
| 2019/0327124 | A1* | 10/2019 | Lai | H04B 1/38 |
| 2019/0364598 | A1* | 11/2019 | Ringland | H04W 16/14 |
| 2020/0003885 | A1* | 1/2020 | Choi | G01S 13/89 |
| 2020/0029117 | A1* | 1/2020 | Kalva | H04N 21/8456 |
| 2020/0166622 | A1* | 5/2020 | Small | G01S 13/4454 |
| 2020/0191943 | A1* | 6/2020 | Wu | G01S 13/726 |
| 2020/0209378 | A1* | 7/2020 | Yokev | H04W 84/12 |
| 2020/0300972 | A1* | 9/2020 | Wang | A61B 5/1126 |
| 2020/0322868 | A1* | 10/2020 | Claffey | H04L 12/44 |

OTHER PUBLICATIONS

International Search Report and Written Opinion for International Application No. PCT/US2021/045033, dated Dec. 3, 2021, 11 pages.

* cited by examiner

COMMUNICATIONS SIGNALS AS RADAR USING SYNCHORONIZED TIME DELAYS OF MULTIPATH REFLECTIONS

PRIORITY

This application claims the benefit under 35 U.S.C. § 119(e) of U.S. Provisional Patent Application No. 63/078,743, filed 15 Sep. 2020, which is incorporated herein by reference.

TECHNICAL FIELD

This disclosure generally relates to augmented or virtual reality environments.

BACKGROUND

Virtual reality is a computer-generated simulation of an environment (e.g., a 3D environment) that users can interact with in a seemingly real or physical way. A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. As virtual reality becomes more and more prominent, its range of useful applications is rapidly broadening. The most common applications of virtual reality involve games or other interactive content, but other applications such as the viewing of visual media items (e.g., photos, videos) for entertainment or training purposes are close behind. The feasibility of using virtual reality to simulate real-life conversations and other user interactions is also being explored.

Augmented reality provides a view of the real or physical world with added computer-generated sensory inputs (e.g., visual, audible). In other words, computer-generated virtual effects may augment or supplement the real-world view. For example, a camera on a virtual reality headset may capture a real-world scene (as an image or video) and display a composite of the captured scene with computer-generated virtual objects. The virtual objects may be, for example, two-dimensional and/or three-dimensional objects, and may be stationary or animated.

SUMMARY OF PARTICULAR EMBODIMENTS

Figure 1:
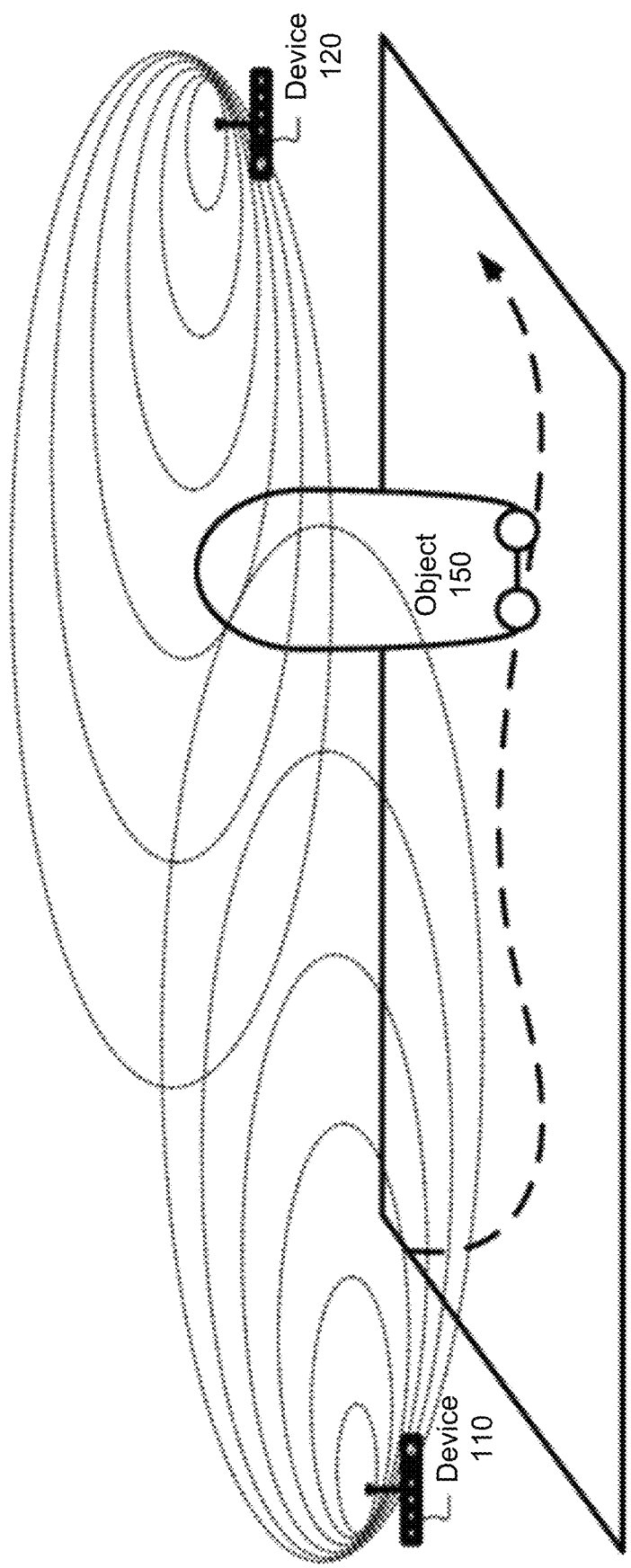
FIG. 1 illustrates an example object moving in an environment with wireless signals.

The invention of this disclosure is directed to the reconstruction of dynamic objects in a virtual environment based on information collected from multiple observers of the objects. Dynamic objects refer to objects that are moving in some form (e.g., a person jogging, a bus moving on the road, the hand of a person waving, etc.). In particular embodiments, the virtual environment may be modeled after the real-world environment such that the objects are reconstructed in the virtual environment at locations corresponding to the objects' locations in the real-world environment. The locations of the objects may be determined based on information received from multiple observers (e.g., devices). In order to combine the information received from multiple observing devices, the devices may need to be synchronized. While the locations of dynamic, moving objects observed by different devices should be consistent with each other if the objects are observed at the same time, in practice, however, the observed locations are often inconsistent with each other due to timing differences between the devices resulting from clock misalignment. This may be due to a phenomena called clock drifting where the clock of any particular device will "drift" or gradually desynchronize from the clocks of other devices. The embodiments disclosed herein provide a solution to these issues by providing a novel method of determining the timing offset between the devices and synchronizing the devices based on the timing offsets.

Embodiments disclosed herein describe determining the clock misalignment between devices based on several techniques based on, but not limited to, (1) distortion patterns in wireless signals received by the devices, (2) observations made by the devices (e.g., coordinate points of keypoint features, camera pose), or (3) an observation made by a first device (e.g., coordinate points of keypoint features) and a reprojection of that observation from the perspective of a second device (e.g., reprojected based on the location and camera pose of the second device).

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, the method of this disclosure may include determining the clock misalignment between devices by comparing the observations of the different devices. If a dynamic object is observed by multiple devices and it is assumed that the locations and orientations of the devices are known and accurate, the observed locations of the object by the different devices, at any given time point, should be the same for all devices. However, if there are clock misalignments between the devices, some devices may register that the object was observed at the location at a slightly different time point than other devices. Such timing offsets may be determined by comparing the observation of one device at a particular time point to the observations of another device, finding a match between the observations of the two devices, and determining the timing difference of the matched observations. This timing difference, or timing offset, may be used to synchronize the devices.

In particular embodiments, the method of this disclosure may include determining the location and orientation of the devices and the object observed by each of the devices based on a tracking algorithm. One example of a tracking algorithm is Simultaneous Localization and Mapping (SLAM). At a high-level, SLAM is a technique that may be used to generate a 3D map of an unknown environment (e.g., in real time). The SLAM technique may employ sensor data from a variety of sensors, including, for example, cameras, LiDAR sensors, radar, gyroscope, and any other suitable types of sensors. In particular embodiments, SLAM implemented on conventional mobile phones may use the phone's camera(s), gyroscope, and/or accelerometer. Conceptually, given a video frame, SLAM may estimate the relative position and orientation of the camera and features of interest in the scene (e.g., often edges, corners, etc.) and iteratively update the estimates based on motion and the resulting feature observations. Based on positional deviations of those features due to movement, SLAM may use triangulation techniques to generate a 3D model of the recognizable objects in the captured scene. For example, when the camera moves, a landmark point associated with a feature of interest may move. Movement of that landmark (and other landmarks) may be used to estimate the 3D position and orientation of objects. Another example of a tracking algorithm is location tracking based on global positioning system (GPS).

In particular embodiments, the observations made by a device may include keypoint features extracted from the objects. Keypoint features refer to distinctive features of an object that remain relatively invariant with respect to changes in scale, rotation, affine distortions, viewpoints, noise, or illumination. For example, if the object is a vehicle, keypoint features may include points along the outer edges, wheels, or side-view mirrors. If the object is a person, keypoint features may include the person's head, shoulders, hands, knees, or feet. When observations are made by the devices, the devices may identify keypoint features of objects and determine the coordinate points of the keypoint features within the 3D environment based on tracking algorithms. Each keypoint feature collected by the devices may be stored in a database, along with the coordinate points of the keypoint features and the device's camera pose at the time of capture. The database may be indexed based on the timestamps associated with each observation (e.g., the point in time the keypoint features were captured by the device).

In particular embodiments, the method of this disclosure is directed to an image-based pose detection approach that includes comparing the observations of the devices (e.g., keypoint features, coordinate points of the keypoint features, camera pose) and determining the timing offset based on the comparison. For example, if device A and device B both observe the same dynamic object, device A's observation at a particular time point could be compared with device B's observation at the same time point. This may involve comparing the coordinate points of the object's keypoint features, as determined by device A, along with device A's camera pose, with those of device B's. If there is a discrepancy between the observations, it may be attributed to a clock misalignment between the devices. To determine the timing offset resulting from the clock misalignment, device A's observation could be compared to device B's historical observations stored in a database. If there is a match between device A's observation and one of device B's historical observations, the timing offset between device A and device B may be determined by comparing the time stamps associated with the matched observations. The observation matching process may involve comparing the coordinate points of the keypoint features and camera pose associated with each of the observations and calculating error metric values indicating how closely matched the observations are.

In particular embodiments, the method of this disclosure is directed to an image-based pose detection approach that includes comparing the observation of a device (e.g., coordinate points of the keypoint features) with a reprojection of that observation from the perspective of another device and determining the timing offset between the devices based on the comparison. For example, if device A and device B both observe the same dynamic object, device A's observation at a particular time point may be reprojected based on the location and camera pose of device B at the same time point. Then device A's observation may be compared with the reprojection from device B's perspective. This may involve comparing the coordinate points of the object's keypoint features, as determined by device A, along with device A's camera pose, with those of the reprojection from device B's perspective (e.g., device B's location and camera pose). If there is a discrepancy between the observations, it may be attributed to a clock misalignment between the devices. To determine the timing offset resulting from the clock misalignment, or temporal correspondences, device A's observation may be further reprojected based on device B's historical observations. The method may then include comparing device A's observation to each of the reprojections and find a match that produces the smallest error metric value. Then, the timing offset between the devices may be determined based on timing information associated with device A's observation and the reprojection that produced the smallest error metric value.

Figure 2:
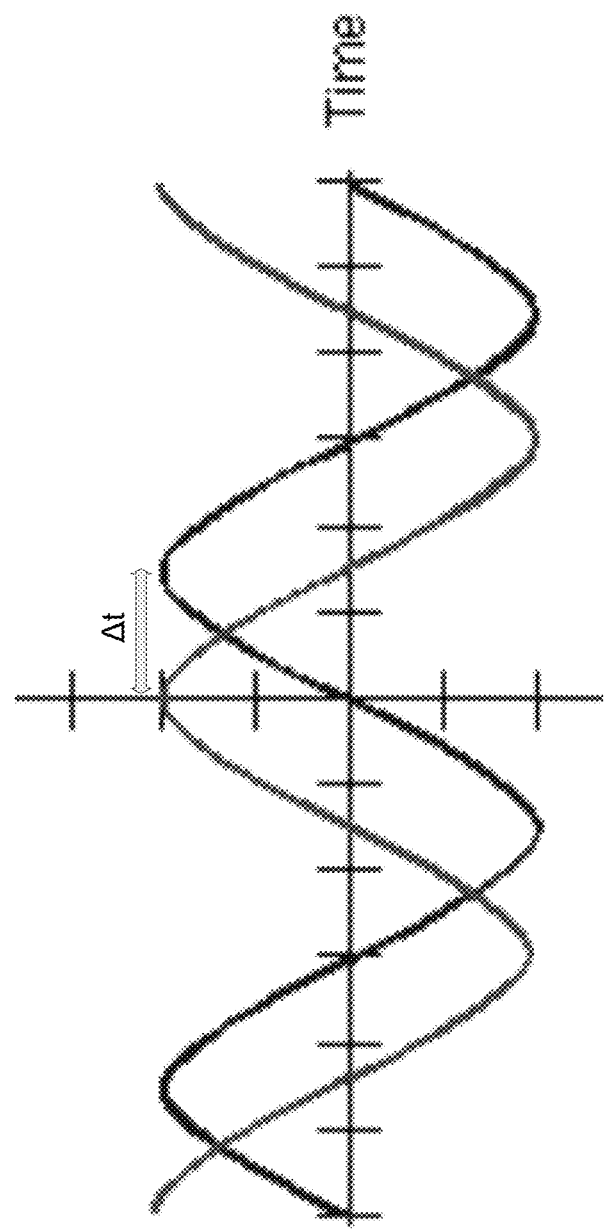
FIG. 2 illustrates two wireless signals.

In particular embodiments, the method of this disclosure is directed to a radar signal detection approach that includes determining the clock misalignment between devices by leveraging wireless signals in an environment. When wireless signals, or passive radar (e.g., Wi-Fi or Bluetooth signals), are present an environment, movement of an object or person within the environment may causes Doppler shifts or distortions in the wireless signals. Doppler shift refers to the change in the frequency of a wave in relation to the relative movement between the wave source and an observer. If an object moving in an environment causes distortions in the wireless signals, each of the devices within the environment receiving the wireless signals should see a corresponding distortion pattern at substantially the same time. However, if there are any clock misalignments between the devices, some of the devices may register as receiving the distortion patterns at slightly different times. This timing difference, or timing offset, could be used to determine the temporal correspondences between data generated by the first device and data generated by the second device. For example, referring to FIG. 1, if a device 110 receives a wireless signal comprising a distortion pattern caused by an object 150 moving in the environment, a device 120 should receive a wireless signal comprising a corresponding distortion pattern at substantially the same time. However, if there are any clock misalignment between device 110 and device 120, there may be a slight timing offset between the distortion patterns received by the devices, such as those illustrated in FIG. 2. Such timing offset between the distortion patterns could be determined by comparing the timing information associated with the distortion patterns.

In particular embodiments, prior to determining the timing offset, the wireless signals received by the device 110 may be compared to those of the device 120 to determine whether the same, or corresponding, distortion patterns have been received by the devices. In such embodiments, the wireless signals received by the devices 110 and 120 may first need to be normalized given that the location of each of the devices when receiving its respective wireless signal may differ from each other. One solution is to combine the radar signal detection approach with the image-based pose detection approaches described above. For example, the position, or location, of each of the devices may be determined based in part on the image-base pose detection approach, then the wireless signals detected by each of the devices may be normalized so the amplitudes of the distortion patterns substantially match each other. In other embodiments, if the device 110 and device 120 are known to be in the same environment (e.g., based on GPS or image-based pose detection approach) and if both devices observe a significant, or unusual, spike in the wireless signals, the unusual spike could be assumed to be caused by the same event (e.g., object movement). In such embodiments, the timing offset between the devices may be determined by comparing the timing information associated with the unusual spike in the wireless signals. In particular embodiments, the timing offset between the devices may be determined even if the devices are separated by walls or obstacles since wireless signals do not require line-of-sight and can traverse through walls.

As discussed above, the method this disclosure may include determining the clock misalignment between devices based on various techniques based on, but not limited to, (1) distortion patterns received by the devices, (2) observations made by the devices (e.g., coordinate points of keypoint features, camera pose), or (3) an observation made by a first device (e.g., coordinate points of keypoint features) and a reprojection of that observation from the perspective of a second device (e.g., reprojected based on the location and camera pose of the second device). In particular embodiments, the method of disclosure may include determining the clock misalignment between devices based on a combination of the techniques described herein. For example, two or more techniques may be utilized, simultaneously or sequentially, by comparing the results of each technique and selecting the technique with the highest likelihood of being accurate. This may include performing the accuracy calculations based on computer-implemented algorithms, such as machine-leaning algorithms. In other embodiments, two or more methods may be utilized, simultaneously or sequentially, by assigning a weight to each of the techniques and combining the results of the techniques based on the assigned weights. For example, if a combination of two techniques is used, each technique could be assigned with 0.5 weight value. Then, the timing offsets determined by each technique could be factored by half and combined with each other. In particular embodiments, the weight value assigned to each of the techniques may be determined based on the environment comprising the devices. For example, if the environment is indoors with various walls and obstacles, a higher weight may be assigned to the technique involving wireless signatures since that technique may produce more accurate results due to the properties of the wireless signals (e.g., can traverse through walls). In other embodiments, the weight value assigned to each of the techniques may be determined based on the characteristics of the observed object. For example, if the form or shape of the object is irregular such that the object appears different based on different view points of the object, a higher weight may be assigned to the technique involving reprojections since calculations based on different perspectives of the object may provide more accurate results.

In particular embodiments, a virtual environmental map representing a real-world environment may be generated to include spatial and temporal descriptors of physical object in the real-world environment. The spatial and temporal descriptors of physical objects included in the virtual environment map indicate the location of the physical objects at various timepoints. The virtual environmental map may be generated and/or maintained by a cloud-based server based on aggregation of image data from various user devices. Given the limitations of what each individual device could capture, the aggregation of image data from the different devices allows the locations of the physical objects to be accurately determined (e.g., by verifying whether the location of an object observed by one device matches with as the location observed by other devices). While the aggregation technique works well for static objects observed by the devices, for dynamic objects, the clock misalignment problems described herein may need to be first accounted for before the objects' locations can be accurately determined.

In particular embodiments, if a server determines, based on image data received from a particular device, that the location of an object observed by the particular device does not match up with the location of the object observed by another device at a particular time point, then the server may further determine the clock misalignment between the devices based on various techniques described herein (e.g., image-based pose detection or radar signal detection approaches). The server may then adjust the timing information associated with the received image data before storing the observations on the virtual environmental map. The server may also provide the determined timing offset to the devices, so the devices can adjust their future observations based on the timing offset before providing them to the server. In some embodiments, the server may instruct the devices to adjust their clocks based on the determine timing offset. In particular embodiments, the server may compare the observations of two devices that are determined to be sufficiently proximate to each other (e.g., located closely to each other at the time of observing an object) to ensure that the physical object observed by one device is the same object observed by another device. For example, the location of the devices may be determined based on GPS data. Alternatively, the location of the devices may be determined based on their respective localization to the virtual environmental map.

In particular embodiments, a server may maintain a central clock associated with the spatial and temporal descriptors of physical objects that have been previously indexed in the virtual environmental map. In such embodiments, if the server receives image data from a particular device, the server may compare the observations of the particular device with the spatial and temporal descriptors indexed in virtual environmental map. If the server determines that the location of the object observed by the particular device does not match up with the location of the object indexed in the virtual environmental map, the server may determine that there is a clock misalignment between the device and the central clock. In such a case, the clock misalignment between the device and the central clock may be determined based on various techniques described herein (e.g., image-based pose detection). The server may then adjust the timing information associated with the received image data, so the observations made by the device correspond to the spatial and temporal descriptors indexed in virtual environmental map. The server may also provide the determined timing offset to the device, so the device can adjust their future observations based on the timing offset before providing them to the server. In some embodiments, the server may instruct the device to adjust its clock to match the central clock. In particular embodiments, the spatial and temporal descriptors of physical objects indexed in the virtual environmental map may be based on the statistical average, or median, of the observations made by the devices. For example, if the location information of an object is observed by ten different devices, the sever may average the location coordinate points of all ten devices and index the average coordinate point to the virtual environmental map.

Figure 3:
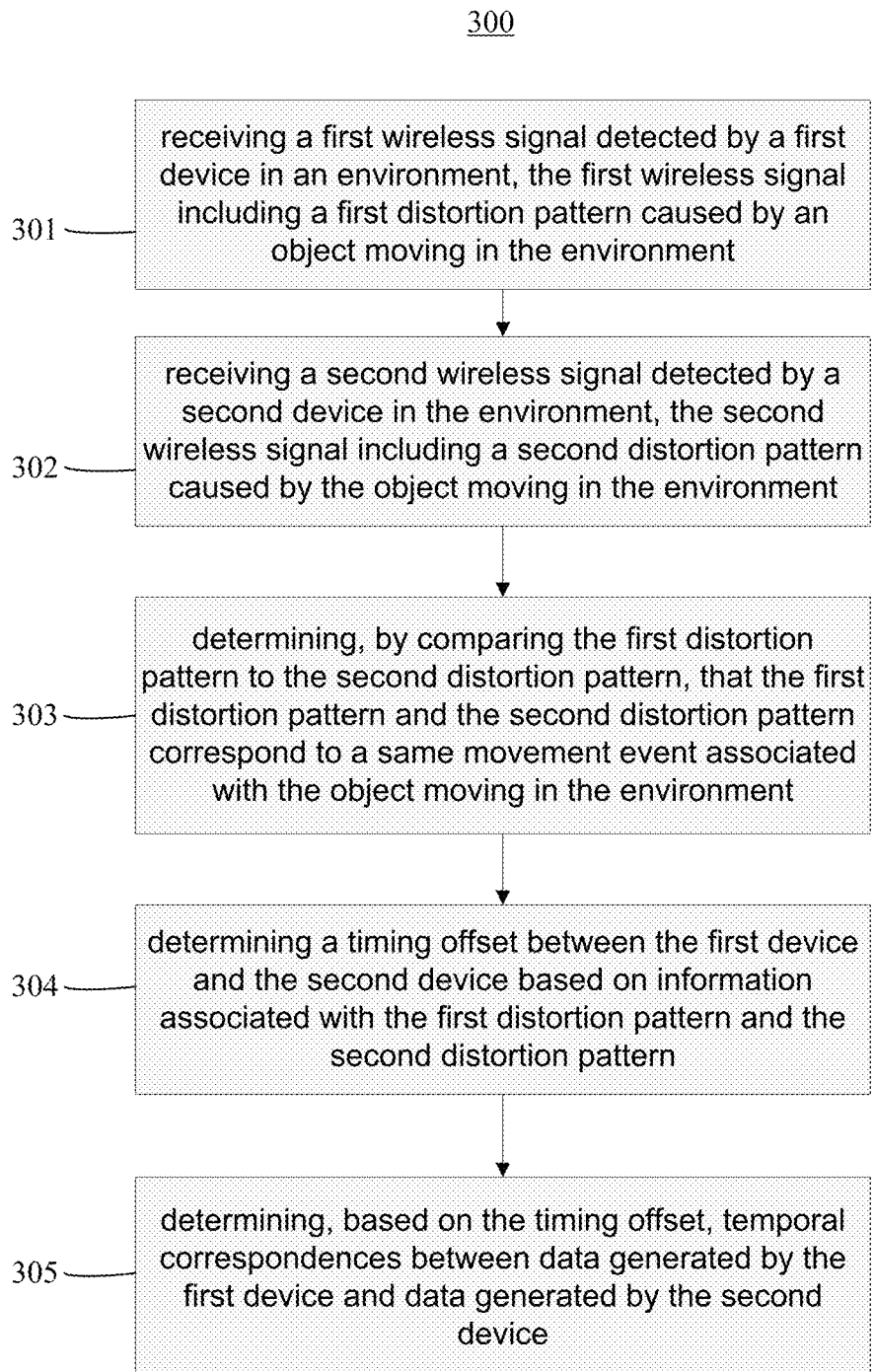
FIG. 3 illustrates an example method of determining the timing offset between devices.

FIG. 3 illustrates an example method 300 for determining the clock misalignment between devices based on Doppler shifts or distortions (e.g., wireless signature) detected in the wireless signals received by the devices. The method may begin at step 310 by receiving a first wireless signal detected by a first device in an environment, the first wireless signal including a first distortion pattern caused by an object moving in the environment. At step 320, the method may continue by receiving a second wireless signal detected by a second device in the environment, the second wireless signal including a second distortion pattern caused by the object moving in the environment. At step 330, the method may continue by determining, by comparing the first distortion pattern to the second distortion pattern, that the first distortion pattern and the second distortion pattern correspond to a same movement event associated with the object moving in the environment. At step 340, the method may continue by determining a timing offset between the first device and the second device based on information associated with the first distortion pattern and the second distortion pattern. At step 350, the method may continue by determining, based on the timing offset, temporal correspondences between data generated by the first device and data generated by the second device. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for determining the clock misalignment between devices based on Doppler shifts or distortions detected in the wireless signals received by the devices including the particular steps of the method of FIG. 3, this disclosure contemplates any suitable method for determining the clock misalignment between devices based on Doppler shifts or distortions detected in the wireless signals received by the devices including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
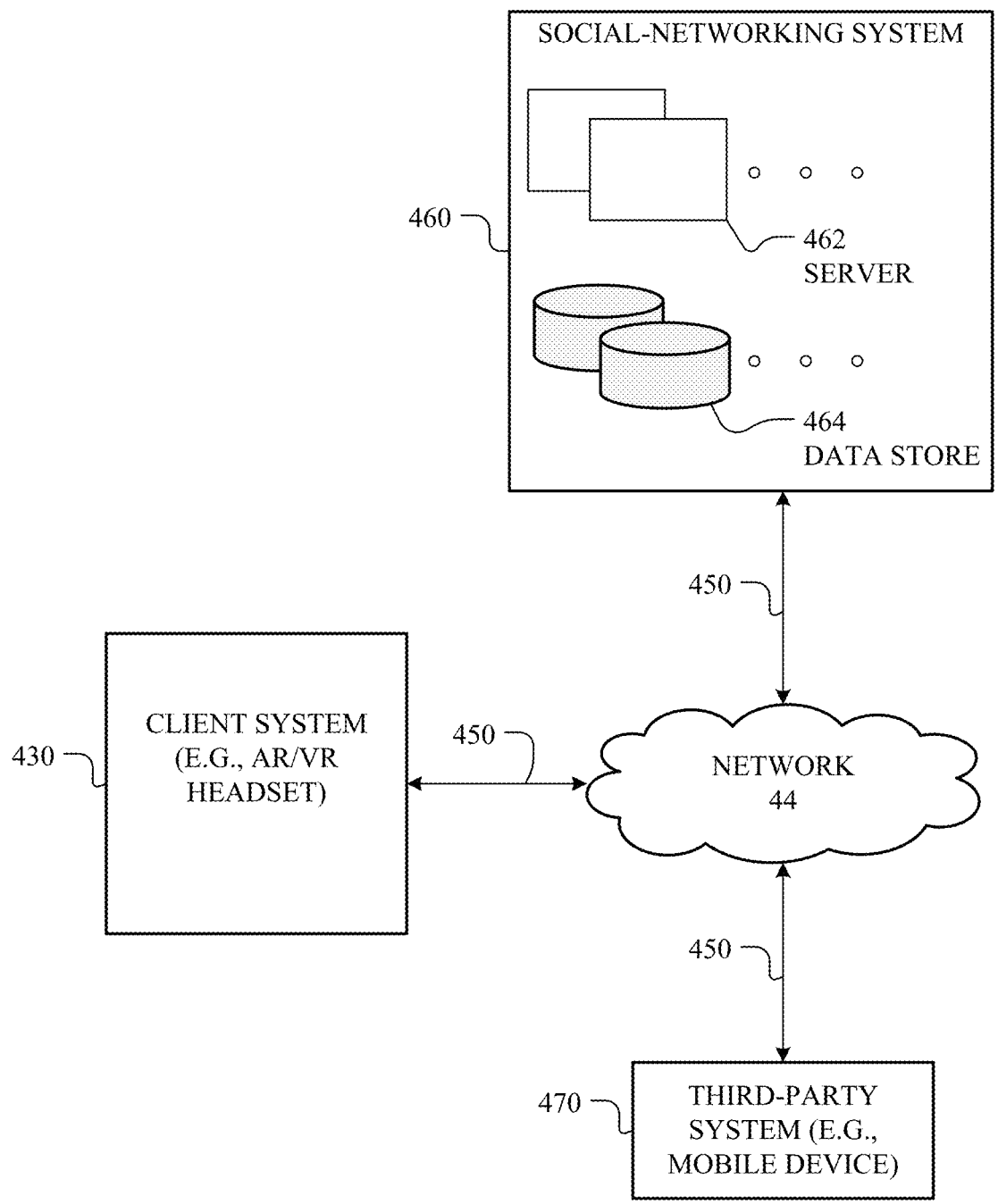
FIG. 4 illustrates an example network environment associated with a social-networking system.

FIG. 4 illustrates an example network environment 100 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, and may have one or more add-ons, plug-ins, or other extensions. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
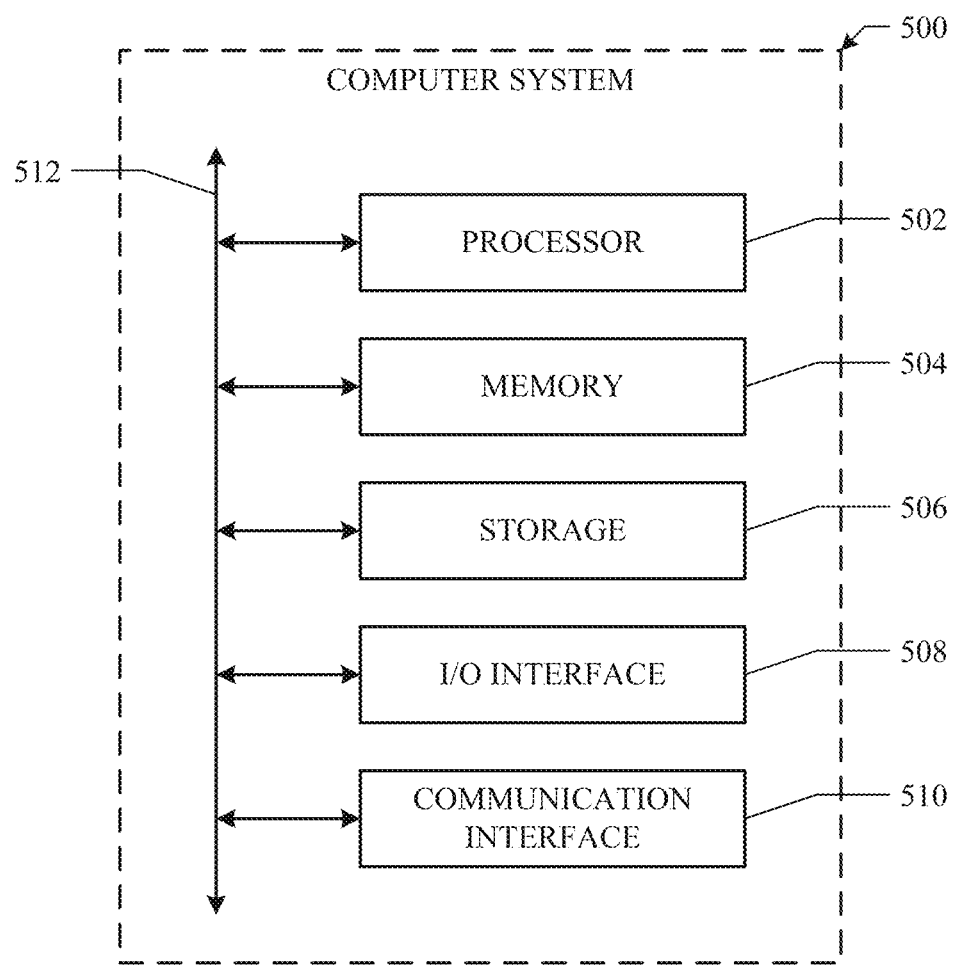
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A method comprising:
receiving a first wireless signal detected by a first device in an environment;
receiving a second wireless signal detected by a second device in the environment;
comparing the first wireless signal detected by the first device with the second wireless signal detected by the second device and determining that a distorted wireless pattern has been observed by both the first device and the second device, wherein the distorted wireless pattern has been caused by an object moving in the environment and corresponds to Doppler shifts associated with the object moving in the environment;
determining that a clock of the first device is misaligned with a clock of the second device based on observation timings of the distorted wireless pattern by the first device and by the second device;
determining a timing offset between the first device and the second device based on the observation timings of the distorted wireless pattern by the first device and the second device; and
determining, based on the timing offset, temporal correspondences between data generated by the first device and data generated by the second device.

2. The method of claim 1, further comprising:
determining that the first device and the second device are both in the environment.

3. The method of claim 1, wherein determining the timing offset between the first device and the second device comprises:
comparing a first timestamp associated with the distorted wireless pattern as observed by the first device with a second stamp associated with the distorted wireless pattern as observed by the second device.

4. The method of claim 1, wherein the first wireless signal and the second wireless signal are Wi-Fi signals.

5. The method of claim 1, wherein the first wireless signal and the second wireless signal are Bluetooth signals.

6. One or more computer-readable non-transitory storage media embodying software that is operable when executed to:
receive a first wireless signal detected by a first device in an environment;
receive a second wireless signal detected by a second device in the environment;
compare the first wireless signal detected by the first device with the second wireless signal detected by the second device and determining that a distorted wireless pattern has been observed by both the first device and the second device, wherein the distorted wireless pattern has been caused by an object moving in the environment and corresponds to Doppler shifts associated with the object moving in the environment;
determine that a clock of the first device is misaligned with a clock of the second device based on observation timings of the distorted wireless pattern by the first device and by the second device;
determine a timing offset between the first device and the second device based on the observation timings of the distorted wireless pattern by the first device and the second device; and
determine, based on the timing offset, temporal correspondences between data generated by the first device and data generated by the second device.

7. The one or more computer-readable non-transitory storage media of claim 6 embodying software that is further operable when executed to:
determine that the first device and the second device are both in the environment.

8. The one or more computer-readable non-transitory storage media of claim 6, wherein determining the timing offset between the first device and the second device comprises:
comparing a first timestamp associated with the distorted wireless pattern as observed by the first device with a second stamp associated with the distorted wireless pattern as observed by the second device.

9. The one or more computer-readable non-transitory storage media of claim 6, wherein the first wireless signal and the second wireless signal are Wi-Fi signals.

10. The one or more computer-readable non-transitory storage media of claim 6, wherein the first wireless signal and the second wireless signal are Bluetooth signals.

11. A system comprising: one or more processors; and one or more computer-readable non-transitory storage media in communication with the one or more processors, the one or more computer-readable non-transitory storage media comprising instructions that when executed by the one or more processors, cause the system to:
receive a first wireless signal detected by a first device in an environment;
receive a second wireless signal detected by a second device in the environment;
compare the first wireless signal detected by the first device with the second wireless signal detected by the second device and determining that a distorted wireless pattern has been observed by both the first device and the second device, wherein the distorted wireless pattern has been caused by an object moving in the environment and corresponds to Doppler shifts associated with the object moving in the environment;
determine that a clock of the first device is misaligned with a clock of the second device based on observation timings of the distorted wireless pattern by the first device and by the second device;
determine a timing offset between the first device and the second device based on the observation timings of the distorted wireless pattern by the first device and the second device; and
determine, based on the timing offset, temporal correspondences between data generated by the first device and data generated by the second device.

12. The system of claim 11, wherein the instructions, when executed by the one or more processors, further cause the system to:
determine that the first device and the second device are both in the environment.

13. The system of claim 11, wherein determining the timing offset between the first device and the second device:
comparing a first timestamp associated with the distorted wireless pattern as observed by the first device with a second stamp associated with the distorted wireless pattern as observed by the second device.

14. The system of claim 11, wherein the first wireless signal and the second wireless signal are Wi-Fi or Bluetooth signals.

\* \* \* \* \*